Sept. 20, 1966    G. B. A. YOUNG ET AL    3,273,921
JOINT FOR USE IN SCAFFOLDING
Filed June 2, 1964

United States Patent Office 3,273,921
Patented Sept. 20, 1966

3,273,921
JOINT FOR USE IN SCAFFOLDING
George Bernard Arthur Young, Lichfield, and Kenneth John Cadman, Sutton Coldfield, England, assignors to Rapid Metal Developments Limited, Birmingham, England
Filed June 2, 1964, Ser. No. 371,926
Claims priority, application Great Britain, June 4, 1963, 30,694/63; Aug. 2, 1963, 22,116/63
3 Claims. (Cl. 287—53.5)

This invention relates to a joint for use in scaffolding and has for an object the provision of such a joint in a convenient form.

A joint in accordance with the invention comprises a lug on one of a pair of members to be connected together, a bracket on the other member, the lug and the bracket being provided respectively with a pair of surfaces which are interengaged when the joint is assembled, a rotatable member mounted on the bracket and formed at one end with a screw thread, a frustoconical or other tapering cam portion on the rotatable member which is engageable with a coacting part of the lug and a nut mounted on the bracket and engaged by said screw thread on the rotatable member, the arrangement being such that rotation of the rotatable member in one direction causes said cam portion to engage said coacting part of the lug to urge said surfaces on the lug and the bracket into engagement.

Figure 2:
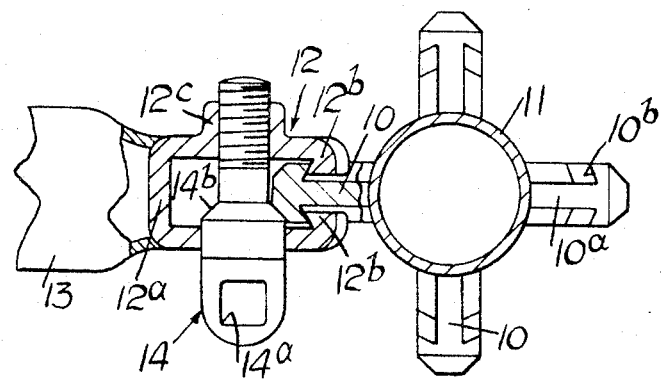
Figure 1:
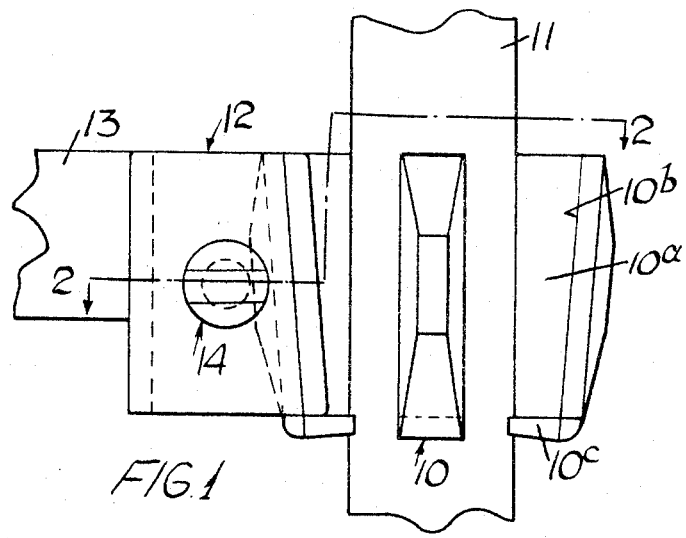

Reference will now be made to the accompanying drawings in which FIGURE 1 is a side view of one example of a joint according to the invention, and FIGURE 2 is a section on the line 2—2 in FIGURE 1.

In the example shown in the drawings the joint includes a lug 10 which may be secured (such as by welding) to a scaffold tube 11, or which may be formed integrally with a collar (not shown) carrying a plurality (e.g. four) of identical lugs. Each lug is of generally T-shaped cross-sectional configuration, the outer sides of the flanges of the T being bevelled at 45°. The weg 10a of the T increases in width from one end of the lug 10 to the other so that the planes of the flanges of the T are inclined to the longitudinal axis of the tube to which the lug or lugs is or are secured. At the smaller end of the web 10a the lug has a pair of supporting portions 10c.

The joint also includes a bracket 12 of generally channel-shaped form, the web 12a of the bracket being secured to one end of the scafford tube 13 which it is required to connect to the first-mentioned tube 11. The two sides of the bracket are provided respectively with a pair of inturned flanges 12b and the inner surfaces of these flanges engage the inner surfaces 10b of the flanges of the lug 10 when the joint is assembled. The inner surfaces 10b of the flanges of the lug 10 are not at right angles to the web 10a of the lug, but are inclined such that an acute angle greater than 45° is included between each surface 10b and the adjoining surface of the web 10a. The inner surfaces of the flanges 12b are similarly inclined to the sides of the bracket 12.

The sides of the bracket 12 are formed respectively with a pair of bores, of which one is of larger diameter than the other. Secured or formed over the outer end of the smaller bore is a nut 12c which coacts with the screw-threaded end of a rotatable member 14. The opposite end of the rotatable member is a head of larger diameter than the screw-threaded end and is provided with an eye 14a. The portion 14b of the rotatable member interconnecting the screw-threaded end and the larger end is of frustoconical form of semivertical angle 45° and acts as a cam portion.

To join the two scaffold tubes together the bracket 12 is slipped over the flanges of the lug so that the latter are disposed in the interior of the bracket. The rotatable member 14 is then turned so that the cam portion 14b is drawn towards the nut and into engagement with the bevelled edges of the flanges of the lug 10. This causes the bracket to be displaced laterally relative to the lug and the inner surfaces of the flanges on the lug 10 and the bracket 12 are drawn into clamping engagement. During tightening the bracket is supported by portions 10c of lug 10. The inclination of the inner surfaces of the flanges 10b causes the sides of the bracket 12 to be closed upon one another as the joint is tightened using the rotatable member 14. This ensures that the sides of the bracket 12 do not spring apart in use when the joint is placed under load.

In use the scaffold tube carrying the lugs is used as a vertical member in a scaffold structure and the flanges of the lugs are inclined upwardly and outwardly with respect to the axis of the tube. The pressure on the inner surfaces 10b of the flanges on the lug is thus increased when any load is placed on the horizontal scaffold tube carrying the bracket.

Having thus described our invention what we claim as new and desire to secure by Letters Patent is:

1. A joint for use in scaffolding comprising a bracket of channel shaped form having a web portion secured to one scaffold member, a pair of spaced side portions extending from said web portion, and a pair of inturned flanges on edges of the side portions spaced from the web portion, said flanges having internal engaging surfaces directed towards the web portion; a rotatable member extending between said side portions of the bracket at a position intermediate said inturned flanges and said web portion and comprising a screw-threaded portion engaged in a nut portion integrally formed on one of said side portions of the bracket, and an enlarged head projecting through a hole in the other of said side portions and a frustoconical cam portion between the screw-threaded portion and the head and disposed between the side portions of the bracket; and a lug of T-shaped section comprising a web secured along one edge to another scaffold member and a pair of flanges projecting in opposite directions from the web at an opposite edge thereof, said flanges being bevelled along their external edges at an angle corresponding to the angle of the frustoconical cam portion and having their inner faces inclined to the web of the lug at an acute angle greater than the angle of said frustoconical cam portion, the engaging surfaces of flanges on the bracket being inclined to the side portions thereof at an equal angle and being engaged against the faces of the flanges on the lug adjacent the web thereof, and the cam portion of the rotatable member being engaged against one of the bevelled edges of the flanges of the lug; and the joint being releasable by turning of the rotatable member to displace the latter axially so as to permit disengagement of the bracket from the lug.

2. A joint as claimed in claim 1 in which the width of the web of the lug increases from one end to the other so that the flanges thereof are inclined and the flanges of the bracket are correspondingly inclined to the web portion of the bracket.

3. A joint as claimed in claim 2 in which the lug is provided, at the end at which the web thereof is least wide, with a pair of supporting portions adapted to engage and support the ends of the flanges on the bracket when the cam portion is disengaged from the bevelled flange of the lug.

References Cited by the Examiner

UNITED STATES PATENTS

| | | |
|---|---|---|
| 1,862,027 | 6/1932 | Lord. |
| 1,918,116 | 7/1933 | Mansfield. |
| 2,052,394 | 8/1936 | Fullman _____ 285—404 X |
| 2,381,936 | 8/1945 | Sargent _____ 151—41.7 X |
| 2,848,258 | 8/1958 | Mudd. |
| 3,039,340 | 6/1962 | Libermont _____ 287—103 |

FOREIGN PATENTS

| | | |
|---|---|---|
| 1,330,046 | 5/1963 | France. |
| 436,449 | 6/1948 | Italy. |

CARL W. TOMLIN, *Primary Examiner.*

T. A. LISLE, *Assistant Examiner.*